(12) United States Patent
Kumagai et al.

(10) Patent No.: US 8,239,862 B2
(45) Date of Patent: Aug. 7, 2012

(54) APPARATUS, METHOD, AND COMPUTER PROGRAM PRODUCT FOR PROCESSING INFORMATION

(75) Inventors: Kazuyuki Kumagai, Tokyo (JP); Daisuke Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 951 days.

(21) Appl. No.: 12/261,795

(22) Filed: Oct. 30, 2008

(65) Prior Publication Data

US 2009/0138548 A1 May 28, 2009

(30) Foreign Application Priority Data

Nov. 26, 2007 (JP) .................................. 2007-303914
Jun. 27, 2008 (JP) .................................. 2008-168553

(51) Int. Cl.
G06F 9/455 (2006.01)
(52) U.S. Cl. .............................. 718/1; 709/203; 709/226
(58) Field of Classification Search ........ 718/1; 709/226
See application file for complete search history.

(56) References Cited

U.S. PATENT DOCUMENTS 7,653,729 B2 * 1/2010 Mihira .......................... 709/226
7,802,248 B2 * 9/2010 Broquere et al. ................. 718/1

FOREIGN PATENT DOCUMENTS

| JP | 04-322359 | 11/1992 |
| JP | 10-334058 | 12/1998 |
| JP | 2000-57112 | 2/2000 |
| JP | 2004-192449 | 7/2004 |
| JP | 2005-92811 | 4/2005 |
| JP | 2005-539298 | 12/2005 |
| JP | 2007-135238 | 5/2007 |
| WO | WO2004/023757 A1 | 3/2004 |

OTHER PUBLICATIONS

Aug. 24, 2010 Japanese official action in connection with counterpart Japanese patent application.
Nov. 17, 2009 Japanese official action in connection with a counterpart Japanese patent application No. 2008-168553.

* cited by examiner

Primary Examiner — Chun-Kuan Lee
Assistant Examiner — Benjamin Geib
(74) Attorney, Agent, or Firm — Cooper & Dunham LLP

(57) ABSTRACT

An information processing apparatus includes a plurality of virtual machines, each including an application managing unit that determines whether an application can process a client request by referring to address information specified in the client request and application information. One of the virtual machines includes a request transferring unit that identifies a virtual machine to which a client request is to be transferred by referring to overall application information and address information, and transfers the request to identified virtual machine.

17 Claims, 12 Drawing Sheets

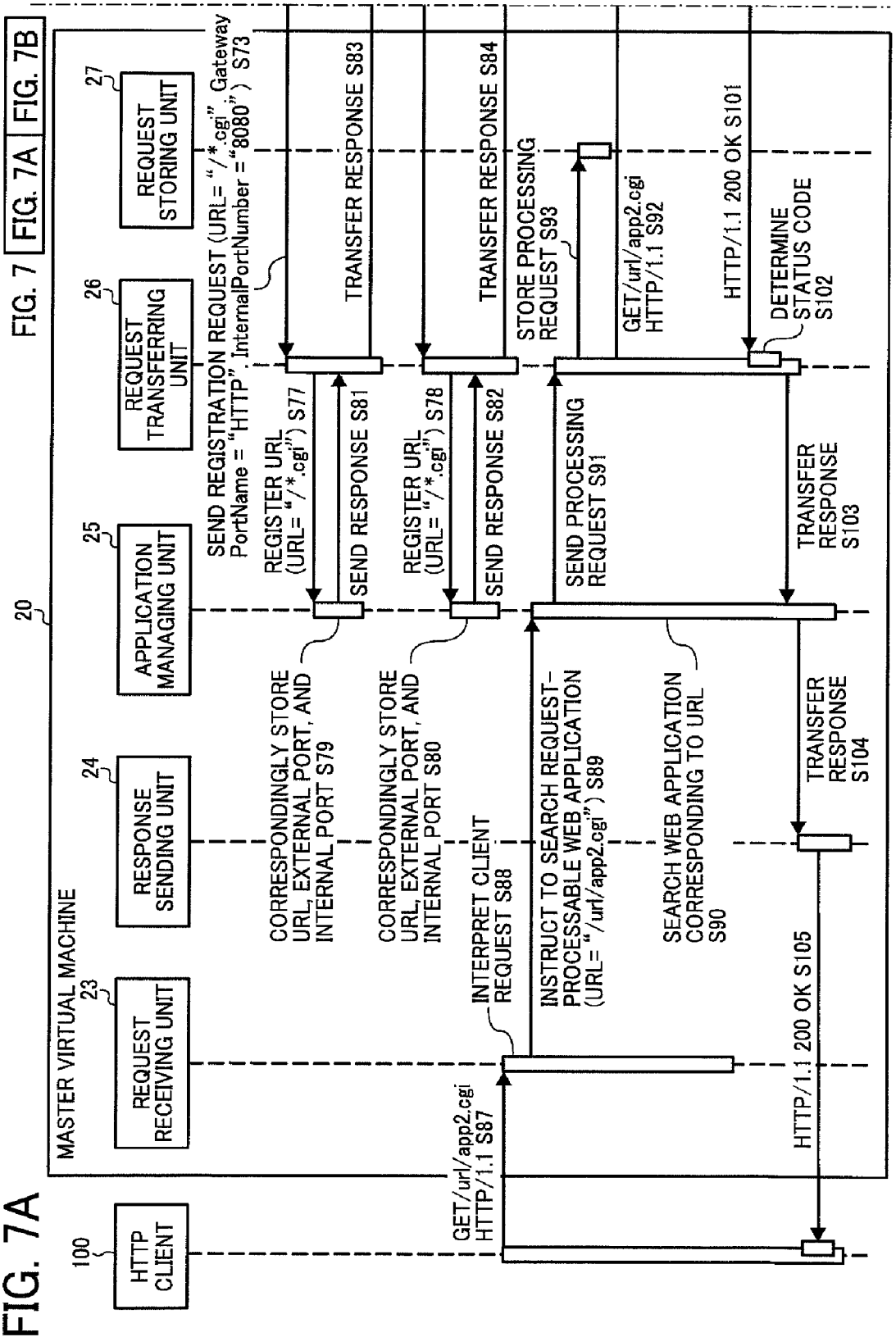

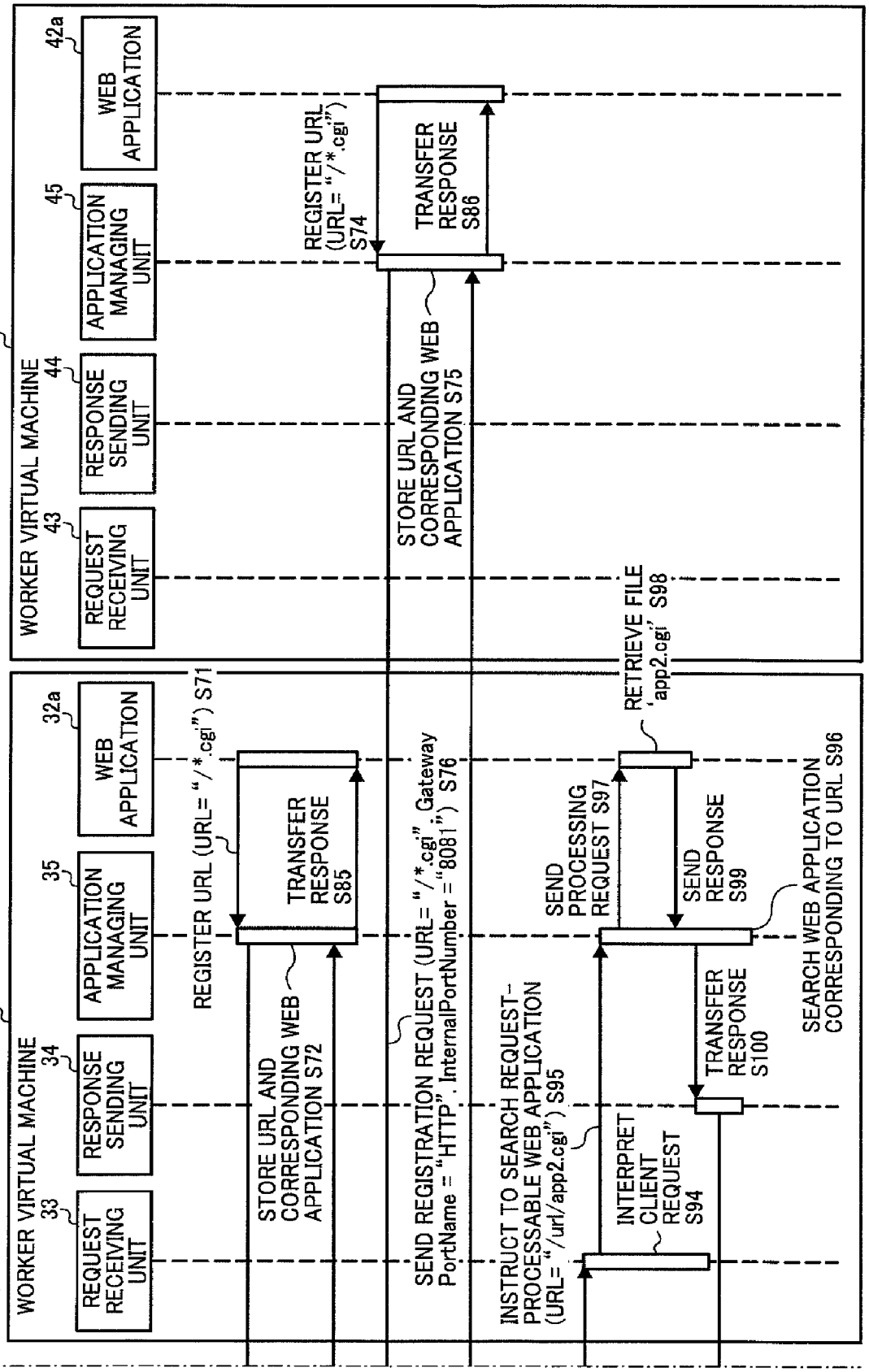

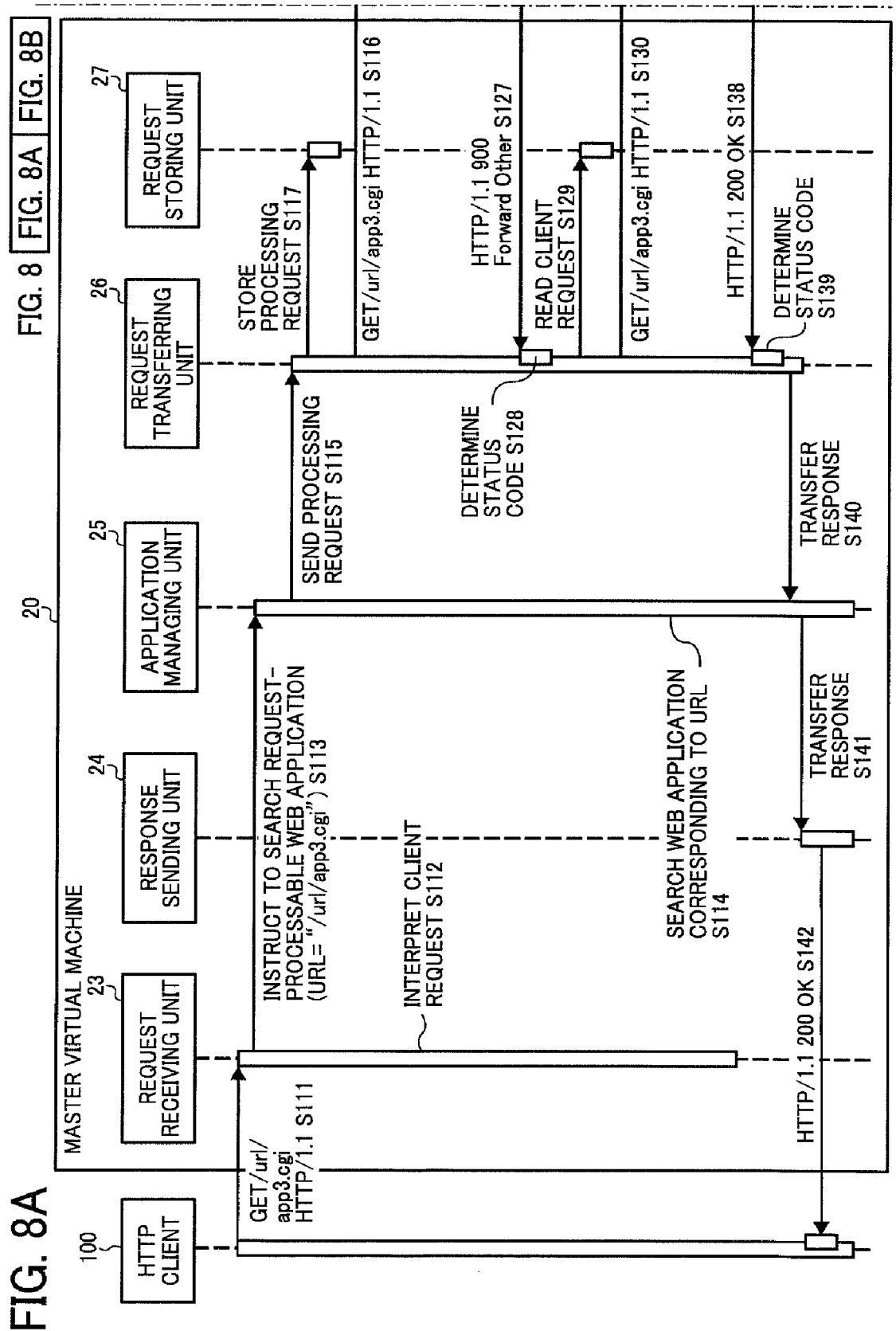

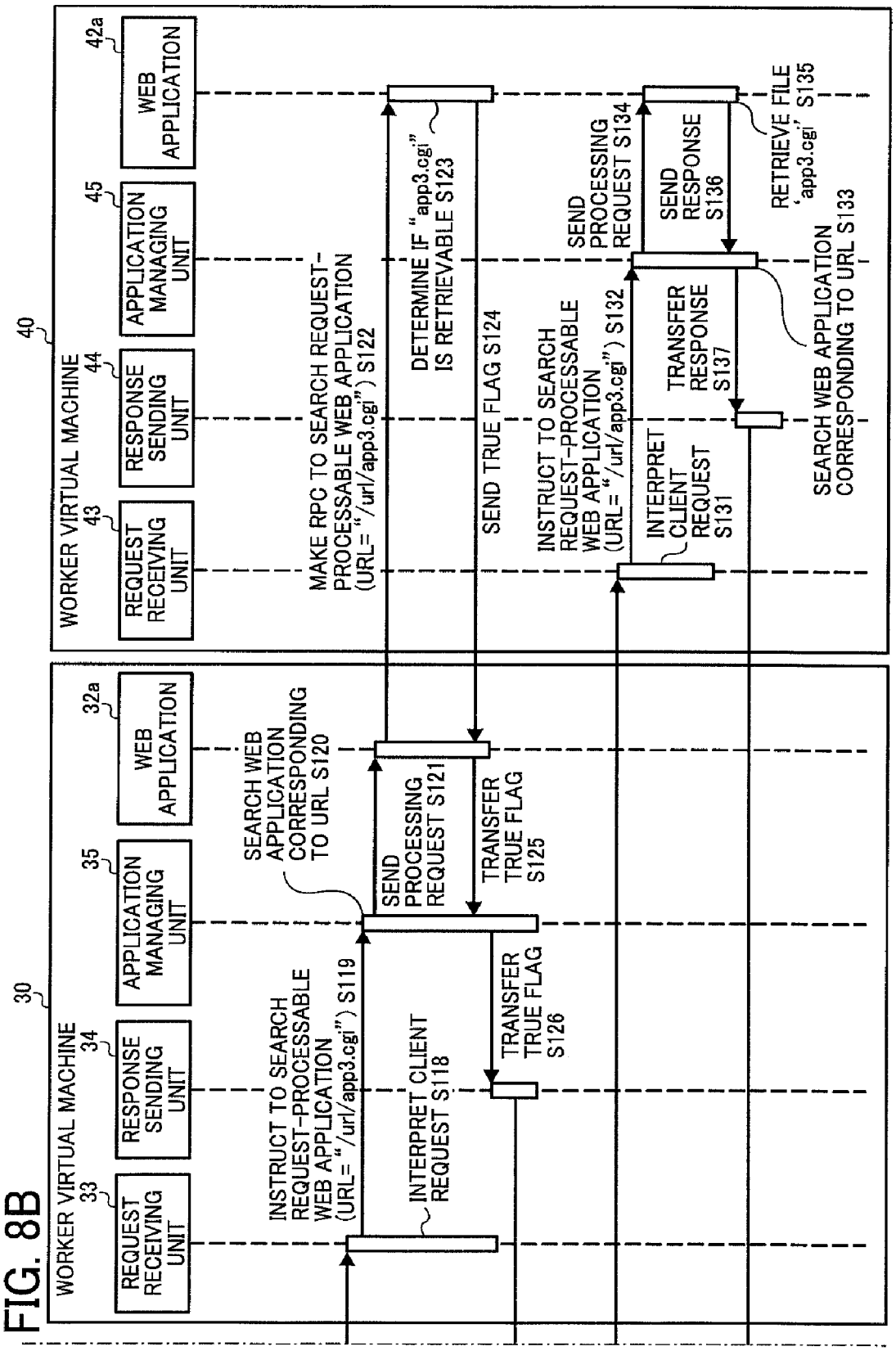

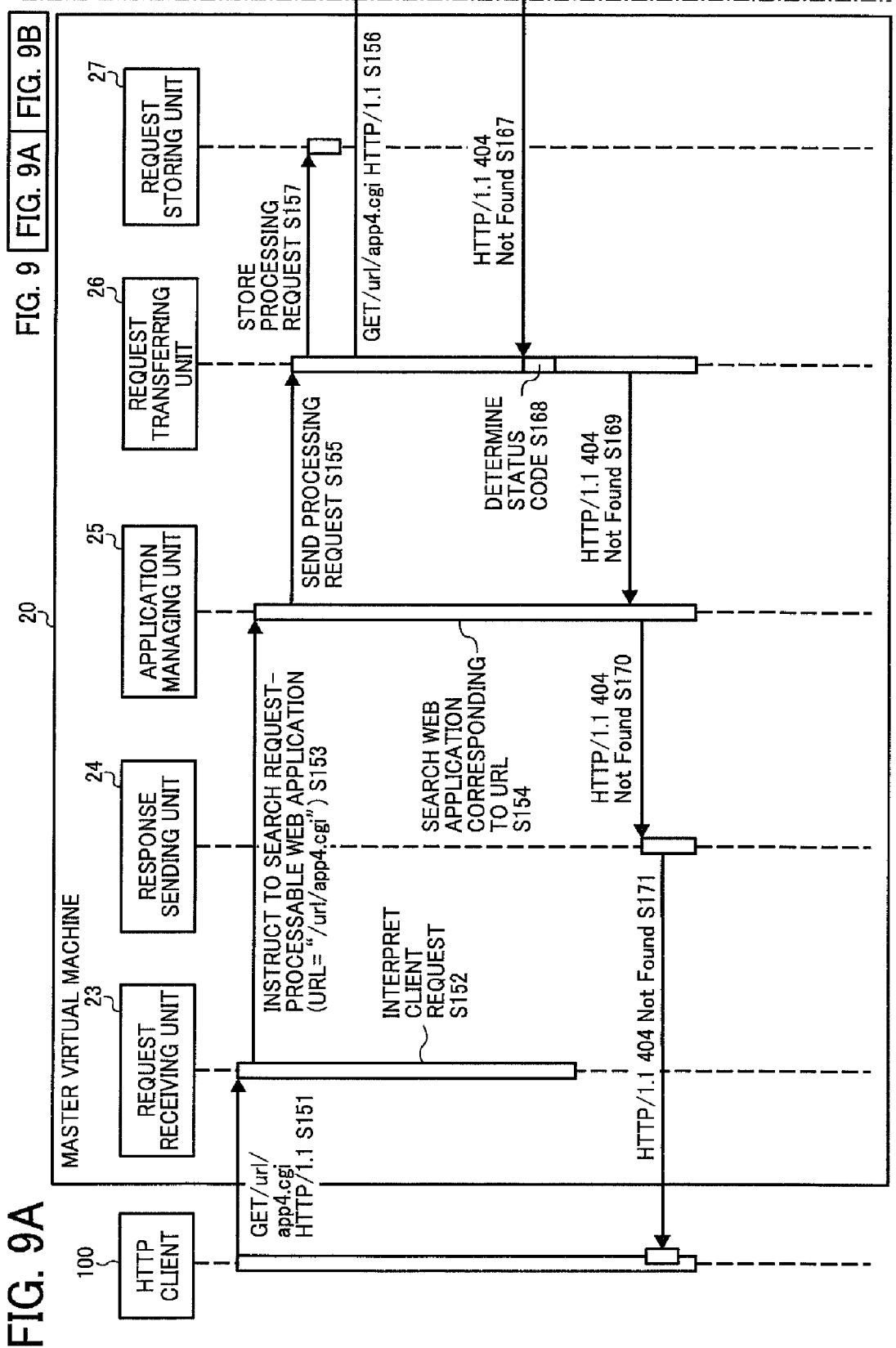

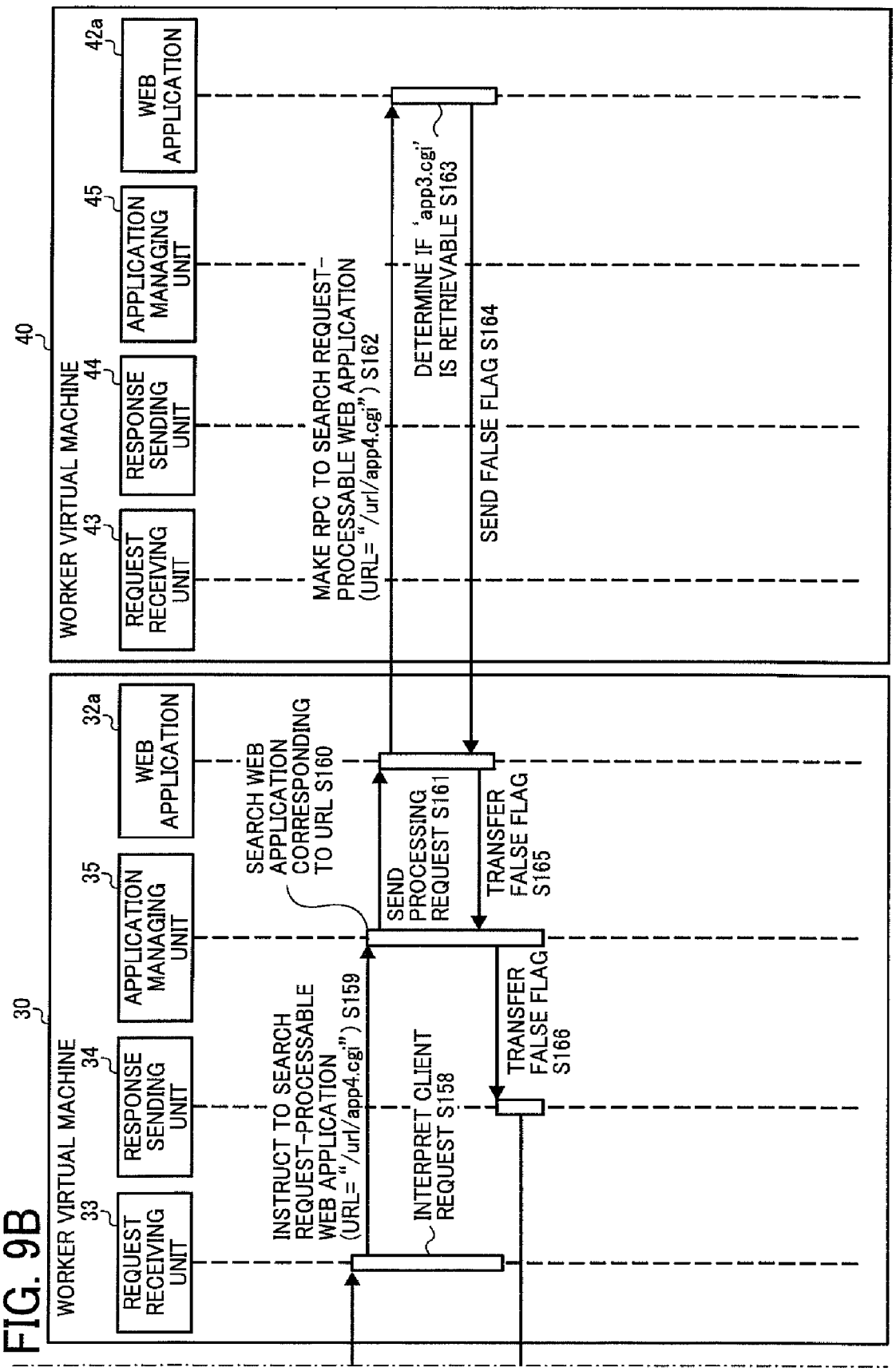

APPARATUS, METHOD, AND COMPUTER PROGRAM PRODUCT FOR PROCESSING INFORMATION

CROSS-REFERENCE TO RELATED APPLICATIONS

The present application claims priority to and incorporates by reference the entire contents of Japanese priority document 2007-303914 filed in Japan on Nov. 26, 2007 and Japanese priority document 2008-168553 filed in Japan on Jun. 27, 2008.

BACKGROUND OF THE INVENTION

1. Field of the Invention

The present invention relates to a technology for developing web applications in a multiple virtual machine environment.

2. Description of the Related Art

In recent years, an office environment system is being built which allows client based customization by adding or deleting applications to process client requests from each of a plurality of clients. The customization can be performed by adding a new application developed by a third party vendor, which provides hardware components or software programs installable in an existing hardware and software configuration. However, it is obvious that such a newly added application should not undermine the basic functions of the system.

Upon receiving a client request corresponding to one of the applications, an office environment system first needs to identify an appropriate resource that can execute the application and then transfer the request to that resource.

To facilitate optimum performance of a server in an office environment system, a technology called capacity on demand is used that, based on the access status or the processing load of the server, controls resources such as a central processing unit (CPU) or a memory in the server. For example, Published Japanese translation of PCT application 2005-539298 discloses a technology for configuring a web server in a remote and dynamic manner such that capacity on demand is used efficiently.

According to that technology, a first server group processes a request from a client device and a third server group provides resources for processing the request. A second server group determines whether the performance of the first server group and the third server group has reached a threshold, and accordingly adds a server to or deletes a server from either one or both of the two server groups. Such use of capacity on demand facilitates in achieving a robust and flexible web server system. Thus, one server can allocate various processing functions to other servers by dynamically adding resources.

Japanese Patent Application Laid-open No. 2007-135238 discloses an image forming apparatus that provides web services without any need to install a driver in a personal computer (PC) of the user and irrespective of the type of the user PC or an operating system (OS) installed in the user PC. The image forming apparatus includes a web service providing unit corresponding to each of a plurality of hardware resources. Upon receiving from the user PC a processing request that includes a message written in a predetermined message routing protocol, a web service function is called that corresponds to web service identification information described in the message such that each web service providing unit can identify a web service based on the web service identification information, control the corresponding hardware resource to provide the identified web service, and send a processing result to the user PC.

Usually, when an office environment system that allows client based customization is built in a process based OS such as UNIX (registered trademark), then the process is divided into an appropriate number of granules to make it robust against errors or exceptions.

However, when Java (registered trademark) is used as the programming language for application development, then a plurality of applications can be executed in a single virtual machine. In that case, it is not reasonable to divide the process in granules. Even so, to enhance the robustness of the office environment system, it can be built to include two virtual machines where web applications for basic functionality are installed in one virtual machine and applications developed by third party vendors are installed in the other virtual machine.

Meanwhile, a system implementing capacity on demand is used for the optimization of server resources, where it is assumed that each server has independent hardware resources. Such a system is not suitable in a multiple virtual machine environment.

Moreover, a system that provides web service irrespective of the user environment is also not suitable for allocating requests to a plurality of virtual machines in a multiple virtual machine environment.

In a multiple virtual machine environment, if an HTTP server is installed to supervise web applications of all virtual machines, then inter-process communication between the HTTP server and the web applications becomes necessary. However, adding inter-process communication functionality in each web application increases the workload of a developer. On the other hand, in a single virtual machine environment, because an HTTP server and a plurality of web applications are installed in the same virtual machine, inter-process communication becomes redundant.

Taking into consideration such issues, a multiple virtual environment is anticipated that allows development of new web applications without inter-process communication functionality and that appropriately determines a web application in one of the virtual machines for processing a client request.

SUMMARY OF THE INVENTION

It is an object of the present invention to at least partially solve the problems in the conventional technology.

According to one aspect of the present invention, there is provided an information processing apparatus that receives information from a client device, processes the information, and sends a processing result to the client device. The information processing apparatus includes a plurality of virtual machines. Each of the virtual machines includes an application; a request receiving unit that receives a request issued by the client device and extracts from the request address information of an application that can process the request; and an application managing unit that correspondingly stores the application and an address thereof as application information, and that, when the request receiving unit receives a request, determines whether the application can process the request by referring to the application information and the address information. One of the virtual machines includes a request transferring unit that correspondingly stores application information and identification information of each of remaining virtual machines as overall application information, and that, when the request receiving unit receives from the client device a request having address information of an application in one of the remaining virtual machines, identifies a virtual machine from among the remaining virtual machines to which the request is to be transferred by referring to the overall application information and the address information, and transfers the request to identified virtual machine.

Furthermore, according to another aspect of the present invention, there is provided a method of information processing in an information processing apparatus that includes a plurality of virtual machines, one of the virtual machines functioning as a master virtual machine and remaining virtual machines functioning as worker virtual machines. Each of the virtual machines correspondingly stores an application and an address thereof as application information, the master virtual machine correspondingly storing the application information and identification information of each of the worker virtual machines as overall application information. The method includes identifying, when the master virtual machine receives from a client device a request that has address information of an application in one of the worker virtual machines, a worker virtual machine to which the request is to be transferred by referring to the overall application information and the address information; transferring the request from the master virtual machine to identified worker virtual machine; determining an application in the identified worker virtual machine that can process the request by referring to corresponding application information and the address information; processing the request with determined application; and sending a processing result from the identified worker virtual machine to the master virtual machine.

Moreover, according to still another aspect of the present invention, there is provided a computer program product including a computer-usable medium having computer-readable program codes embodied in the medium for processing information in an information processing apparatus that includes a plurality of virtual machines. One of the virtual machines functions as a master virtual machine and remaining virtual machines function as worker virtual machines. Each of the virtual machines correspondingly stores an application and an address thereof as application information. The master virtual machine correspondingly stores the application information and identification information of each of the worker virtual machines as overall application information. The program codes when executed cause a computer to execute identifying, when the master virtual machine receives from a client device a request that has address information of an application in one of the worker virtual machines, a worker virtual machine to which the request is to be transferred by referring to the overall application information and the address information; transferring the request from the master virtual machine to identified worker virtual machine; determining an application in the identified worker virtual machine that can process the request by referring to corresponding application information and the address information; processing the request with determined application; and sending a processing result from the identified worker virtual machine to the master virtual machine.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a sequence diagram for explaining a process of registering a plurality of web applications that correspond to a uniform resource locator (URL) with an identical extension;

FIG. 8 is a sequence diagram for explaining a case when a worker virtual machine of highest priority does not include a web application that can process a client request; and FIG. 9 is a sequence diagram for explaining a case when none of the virtual machines include a web application that can process a client request.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
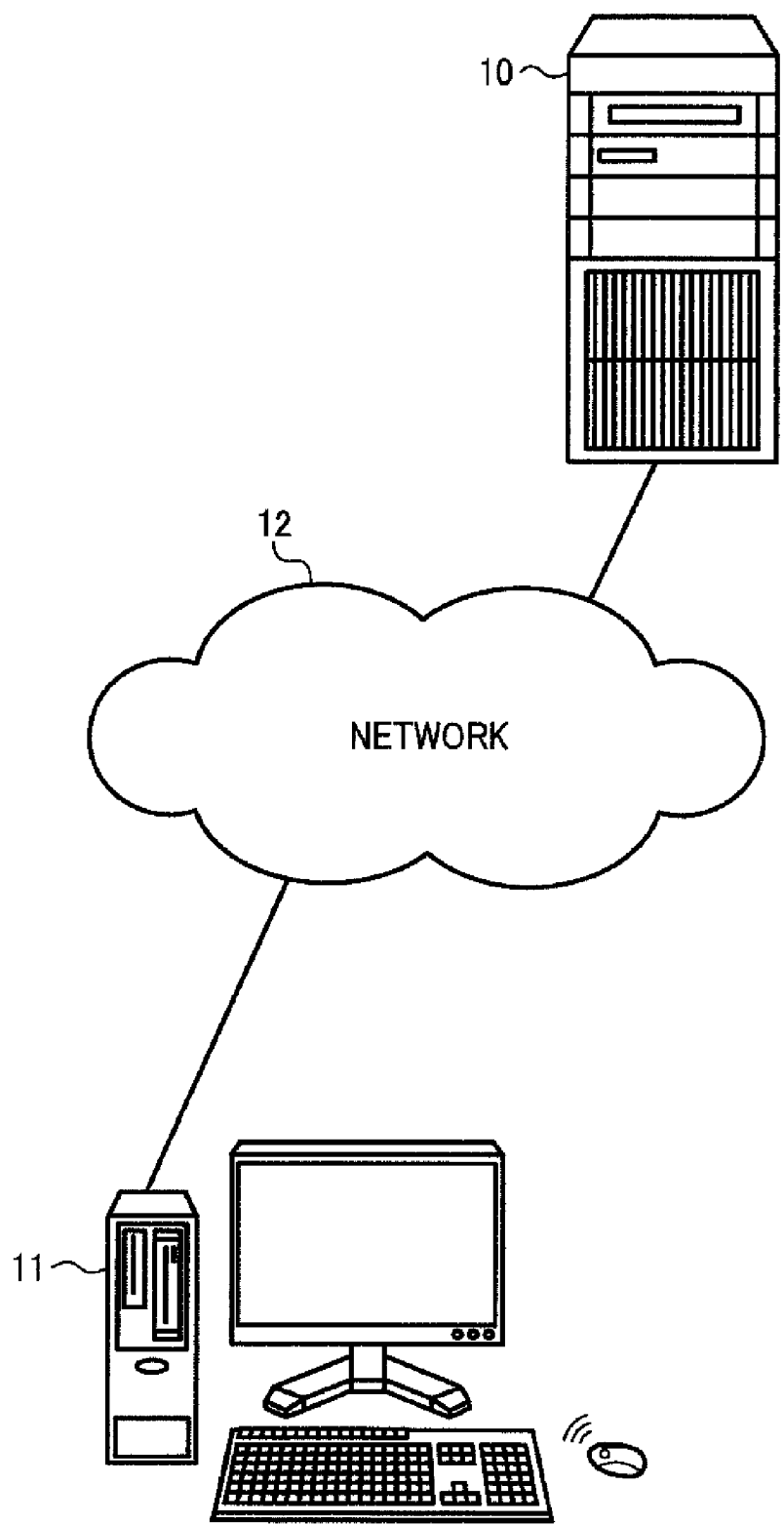
FIG. 1 is a diagram of an exemplary network system according to an embodiment of the present invention.

FIG. 1 is a diagram of an exemplary network system according to an embodiment of the present invention. The network system includes a server 10, which functions as an information processing apparatus, and a client device 11. The server 10 and the client device 11 can perform communication via a network 12 such as Internet.

A web browser program is installed in the client device 11, while a web server program is installed in the server 10. The web server program processes a client request issued from the web browser program by executing a web application and sends back a processing result to the web browser program.

When a user specifies a uniform resource locator (URL) of a web page in the web browser program, the web browser program sends the URL to the web server program as a client request. The web server program obtains from the URL a directory path of a file required to display the web page, retrieves the file from the directory, and sends it to the web browser program.

The communication between a web browser program and a web server program is performed by using a communication protocol such as hyper text transfer protocol (HTTP). A web browser program using HTTP for communication is known as an HTTP client, while a web server program using HTTP for communication is known as an HTTP server. Thus, the web browser program of the client device 11 and the web server program of the server 10 are hereinafter referred to as an HTTP client and an HTTP server, respectively. The HTTP server opens an external port to communicate with the HTTP client. Usually, the HTTP server has a single external port having a unique port number 80.

Meanwhile, each of the server 10 and the client device 11 can be a PC or a multifunction product (MFP) that includes resources (not shown) such as a central processing unit (CPU) for controlling operations, a memory for storing computer programs executed by the CPU, and a communication interface such as a network board or a network card. Meanwhile, although only one client device 11 is shown in FIG. 1, it is possible to arrange two or more client devices 11 that can separately send client requests to the server 10 via the network 12.

Figure 2:
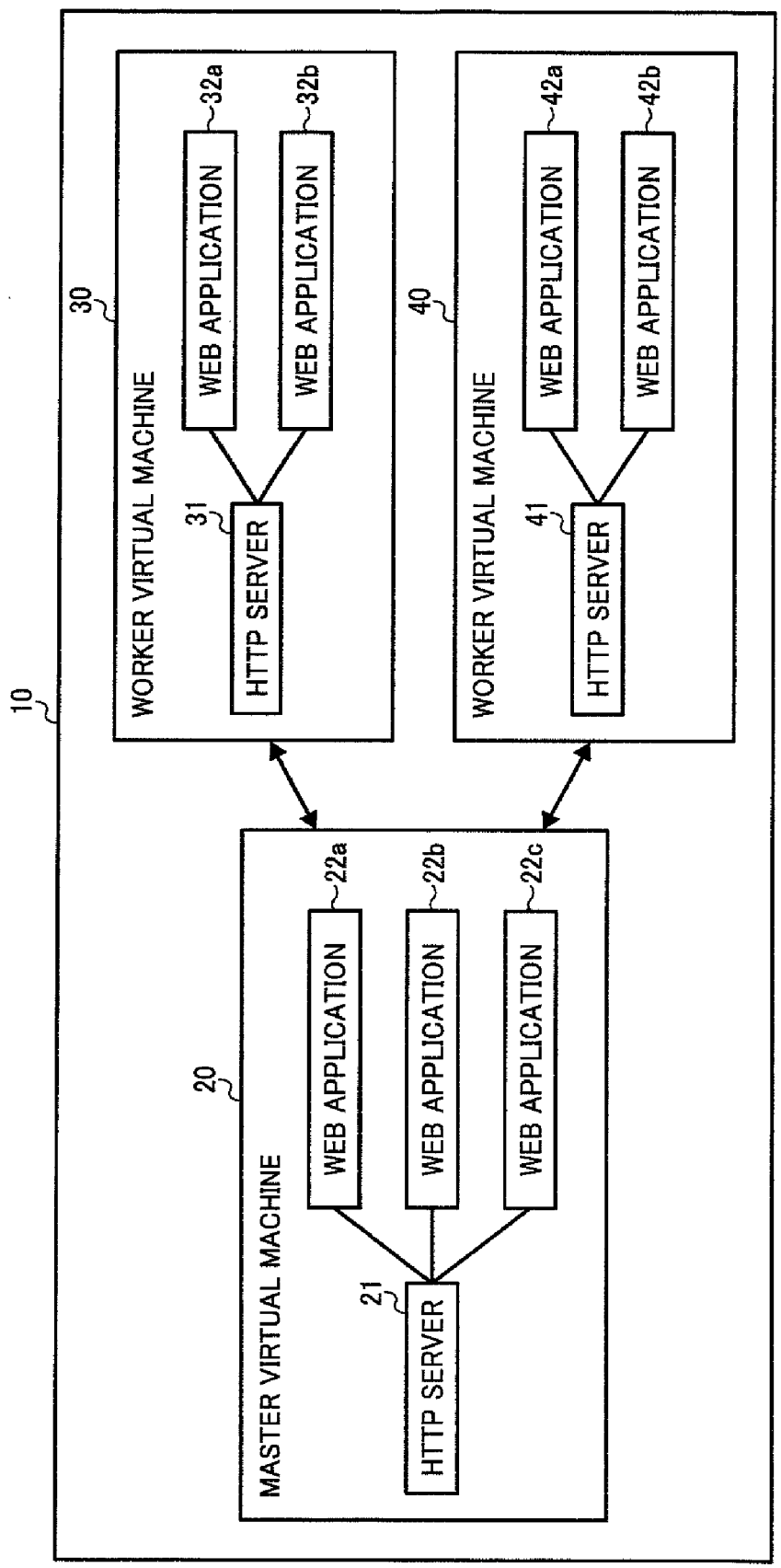
FIG. 2 is a diagram of an exemplary modular configuration of an information processing apparatus in the network system.

FIG. 2 is a diagram of an exemplary modular configuration of the server 10. Usually, a server can be configured to include a plurality of virtual machines. A virtual machine is a software architecture that virtualizes the server by flexibly abstracting (dividing or integrating) the resources of the server irrespective of the actual physical configuration and executes applications on an OS. An example of a virtual machine is a Java virtual machine that is written in the Java programming language. A Java virtual machine resides in the OS as an executable file. Upon execution, the Java virtual machine reads a class file and runs a method written in the class file. In the example shown in FIG. 2, the server 10 includes three virtual machines 20, 30, 40.

It is possible to simultaneously activate the virtual machines 20, 30, and 40, each running an independent OS and executing various applications in the corresponding OS. The virtual machine 20 includes an HTTP server 21 and executes three web applications 22a to 22c. Similarly, the virtual machine 30 includes an HTTP server 31 and executes two web applications 32a and 32b, while the virtual machine 40 includes an HTTP server 41 and executes two web applications 42a and 42b. Each of the HTTP servers 21, 31, and 41 has an identical program module; while each of the web applications 22a, 22b, 22c, 32a, 32b, 42a, and 42b has a different program module.

In the example shown in FIG. 2, the virtual machine 20 functions as a master virtual machine (hereinafter, "master virtual machine 20"), while the virtual machines 30 and 40 function as worker virtual machines (hereinafter, "worker virtual machines 30 and 40") for the master virtual machine 20. A master virtual machine in a server is a virtual machine that can communicate with an external client device by opening an external port. Moreover, if a client request from the client device includes address information (e.g., a URL) of a web application installed in a particular worker virtual machine, then the master virtual machine transfers the client request to that worker virtual machine via a corresponding internal port. An internal port is used exclusively for internal communication inside the server. Subsequently, the worker virtual machine executes the web application corresponding to the URL to process the client request and sends back a processing result to the master virtual machine. Eventually, the master virtual machine sends the processing result to the client device via the external port.

A web application on a Java platform is developed as a Java servlet or a Java server page (JSP). A Java servlet is a Java program executed in the web server program, while a JSP is a hyper text markup language (HTML) file in which a Java program is embedded. A web application is executed by using an application server, which corresponds to an HTTP server. An example of an application server is Tomcat (registered trademark), which provides an HTTP server environment for Java code to run. Similarly, an example of a web application framework is Struts (Registered Trademark), which is used to build web applications based on Java servlets or JSPs. More particularly, Struts is an open source library that provides basic operations such as data input-output, error processing, or screen transition of a Java program. An example of a basic platform to develop a Java based web application is Java 2 Standard Edition (J2SE). The developed web applications are stored in a database.

With reference to FIG. 2, J2SE can be used as a Java virtual machine, while Tomcat can be used as an HTTP server. That is, Tomcat can be run in J2SE to read a web application and execute the Java servlets and the JSPs that configure the web application to process a client request.

Thus, when each of a plurality of virtual machines is configured to include an HTTP server, it is possible to independently develop web applications in each virtual machine. In that case, development of web applications in each virtual machine can be carried out without adding inter-process communication functionality in the web applications. That reduces the workload of a developer thereby enhancing the developing efficiency.

Figure 3:
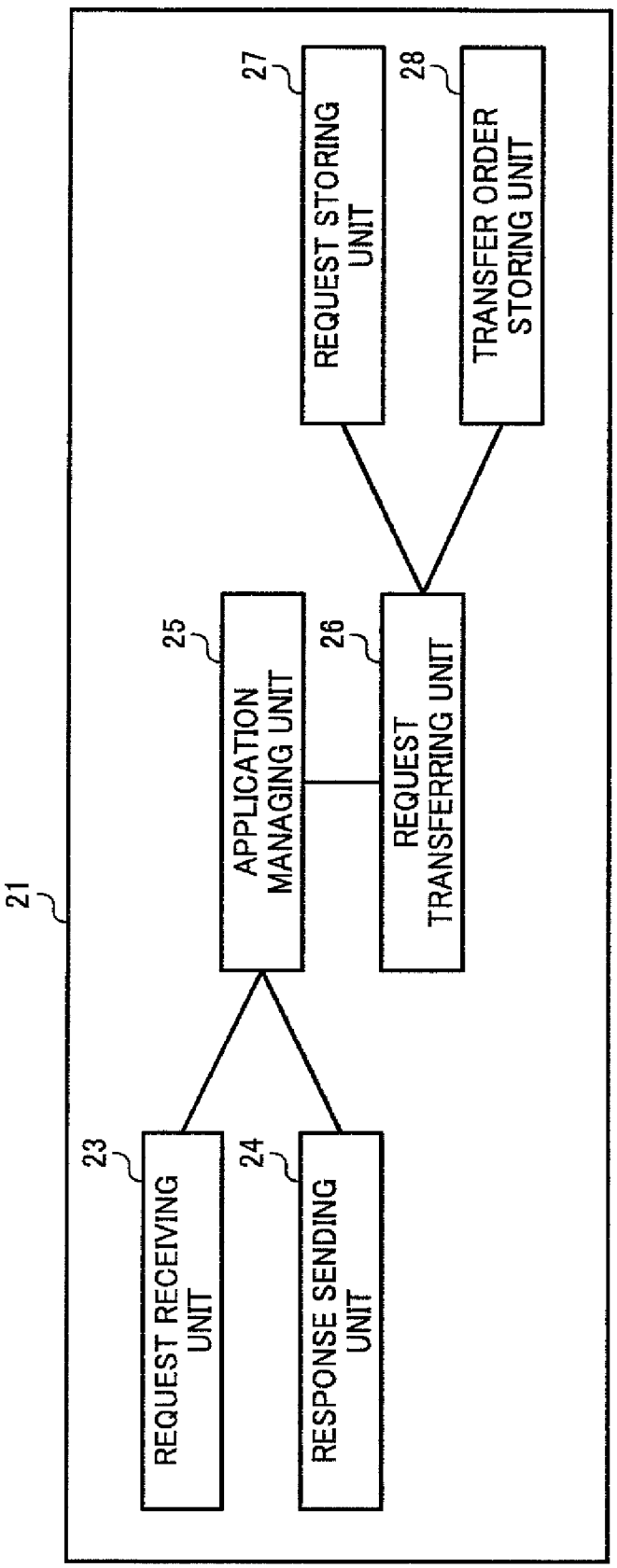
FIG. 3 is a diagram of an exemplary configuration of an HTTP server in the information processing apparatus.

FIG. 3 is a diagram of an exemplary configuration of the HTTP server 21. The HTTP server 21 includes a request receiving unit 23, a response sending unit 24, an application managing unit 25, a request transferring unit 26, a request storing unit 27, and a transfer order storing unit 28. The request receiving unit 23 receives a client request from the HTTP client via the network 12 and interprets the client request. The response sending unit 24 constructs a response from a processing result of the client request and sends the response to the HTTP client. The application managing unit 25 correspondingly stores a plurality of web applications and URLs corresponding to those web applications. The request transferring unit 26 transfers a client request to a worker virtual machine for processing if the URL in the client request corresponds to a web application installed in that worker HTTP server.

The request storing unit 27 is used to temporarily store the client requests for future transfers. The transfer order storing unit 28 is used to store an order of priority in which a request is to be transferred to the worker virtual machines 30 and 40.

Although each of the HTTP servers 21, 31, and 41 has an identical program module, the HTTP server 21 functions as a master HTTP server (hereinafter, "master HTTP server 21") because it is installed in the master virtual machine 20, while the HTTP servers 31 and 41 function as worker HTTP servers (hereinafter, "worker HTTP servers 31 and 41") because they are installed in the worker virtual machines 30 and 40, respectively. The master virtual machine 20 can be configured to include, e.g., web applications for basic functionality. Similarly, the worker virtual machines 30 and 40 can be configured to include, e.g., web applications for additional functionality created by an administrator of the server 10 or web applications developed by a third party vendor.

As described above, in the server 10, only the master virtual machine 20 can communicate with the client device 11 by opening the external port. In other words, the client device 11 can access the external port only after the master virtual machine 20 opens it.

On the other hand, the worker virtual machines 30 and 40 can communicate only with the master virtual machine 20 by opening the corresponding internal ports. In other words, the internal ports enable the worker HTTP servers 31 and 41 to perform internal communication with the master HTTP server 21. The worker HTTP servers 31 and 41 can access the corresponding internal ports by using a loopback address. A unique port number is allocated to each internal port for identification. Usually, the external port is given the port number 80, while the internal ports are given port numbers 8080, 8081, and the like. Herein, it is assumed that the worker HTTP server 31 opens the internal port 8080 and the worker HTTP server 41 opens the internal port 8081. Because the internal ports 8080 and 8081 are used exclusively for internal communication in the server 10, the client device 11 cannot access the internal ports 8080 and 8081 to perform direct communication with the worker HTTP servers 31 and 41.

Meanwhile, a master HTTP server or a worker HTTP server has the knowledge about the type of virtual machine (master or virtual) it belongs to. On the other hand, a web application is not limited by the type of virtual machine and can be managed by either one of a master HTTP server and a worker HTTP server. Thus, while developing a web application, there is no need to take into consideration the type of virtual machine in which it is to be installed.

Figure 4:
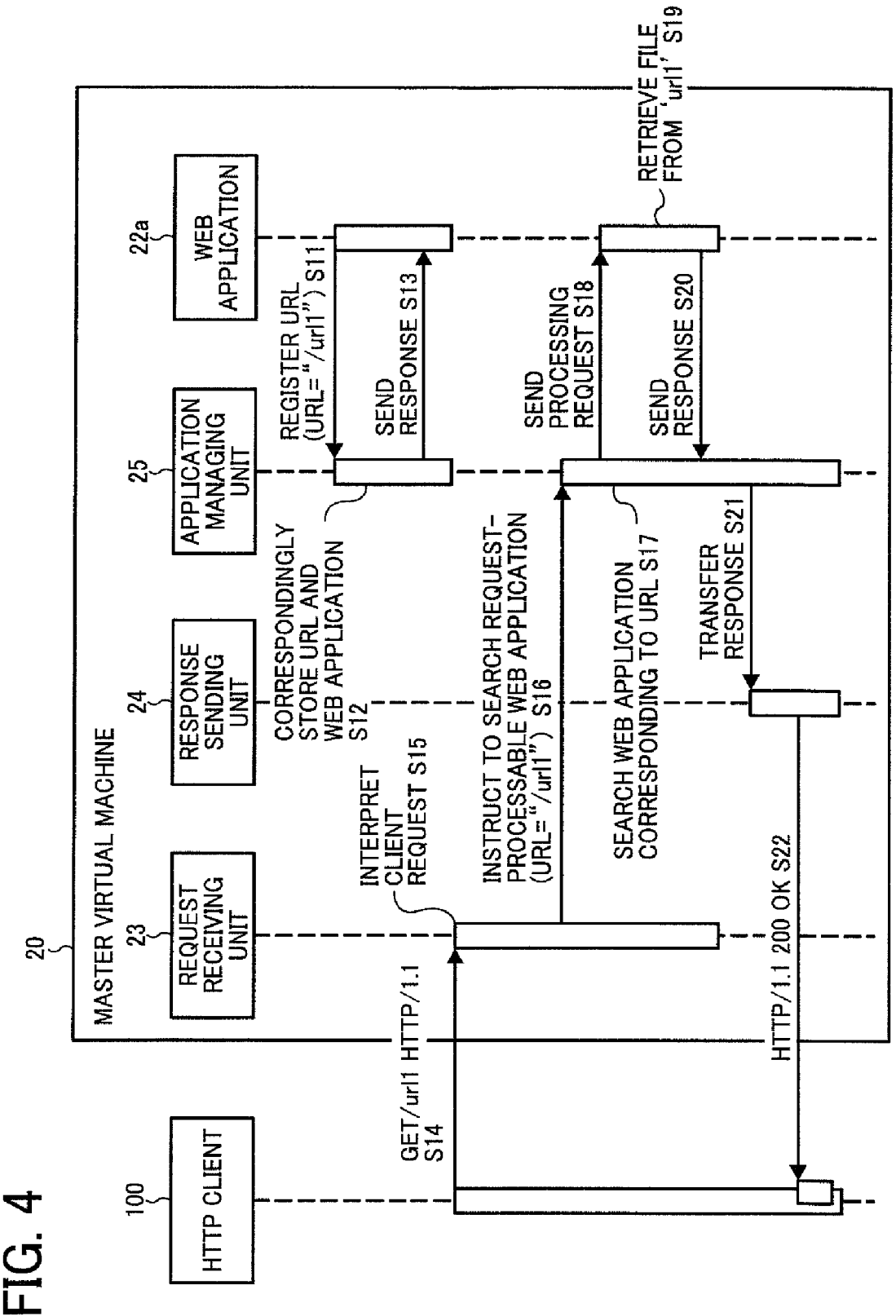
FIG. 4 is a sequence diagram for explaining a process of registering a web application in a master HTTP server and processing a client request.

FIG. 4 is a sequence diagram for explaining a process of registering the web application 22a in the master HTTP server 21 and processing a client request. First, the web application 22a sends a registration request to the master HTTP server 21 for registering a corresponding URL "/url1" (Step S11). The application managing unit 25 correspondingly stores the web application 22a and the URL "/url1" in a correspondence table (Step S12). Subsequently, the application managing unit 25 sends a registration response to the web application 22a (Step S13).

Consider a case when an HTTP client 100 of the client device 11 sends a client request 'GET/url1 HTTP/1.1' to the master virtual machine 20 (Step S14). The request receiving unit 23 receives and interprets the client request (Step S15). Herein, the client request 'GET/url1 HTTP/1.1' is interpreted as 'retrieve the file from the address specified in the URL "/url1" by using the transfer protocol HTTP/1.1'. Subsequently, the request receiving unit 23 sends the client request to the application managing unit 25 and instructs the application managing unit 25 to search for a web application that can retrieve the file from the address specified in the URL "/url1" (Step S16).

The application managing unit 25 then refers to the correspondence table and searches for a web application that corresponds to the URL "/url1" (Step S17). Upon finding the web application 22a as the intended web application, the application managing unit 25 sends a processing request to the web application 22a (Step S18). Subsequently, the web application 22a retrieves the file from the address specified in the URL "/url1" (Step S19) and sends a response to the application managing unit 25 (Step S20).

The application managing unit 25 transfers the response to the response sending unit 24 (Step S21). In turn, the response sending unit 24 sends the response to the HTTP client 100 (Step S22). In the example shown in FIG. 4, the response includes a message 'HTTP/1.1 200 OK', where 'HTTP/1.1' is the transfer protocol and '200' is the HTTP status code indicating that the file retrieval is successful. The response also includes the retrieved file from the address specified in the URL "/url1". When the HTTP client 100 receives the response from the master HTTP server 21, the web page corresponding to the retrieved file is displayed on a display screen (not shown) of the client device 11. Meanwhile, the process of registering the web applications 22b and 22c in the master HTTP server 21 is also performed in an identical manner.

Figure 5:
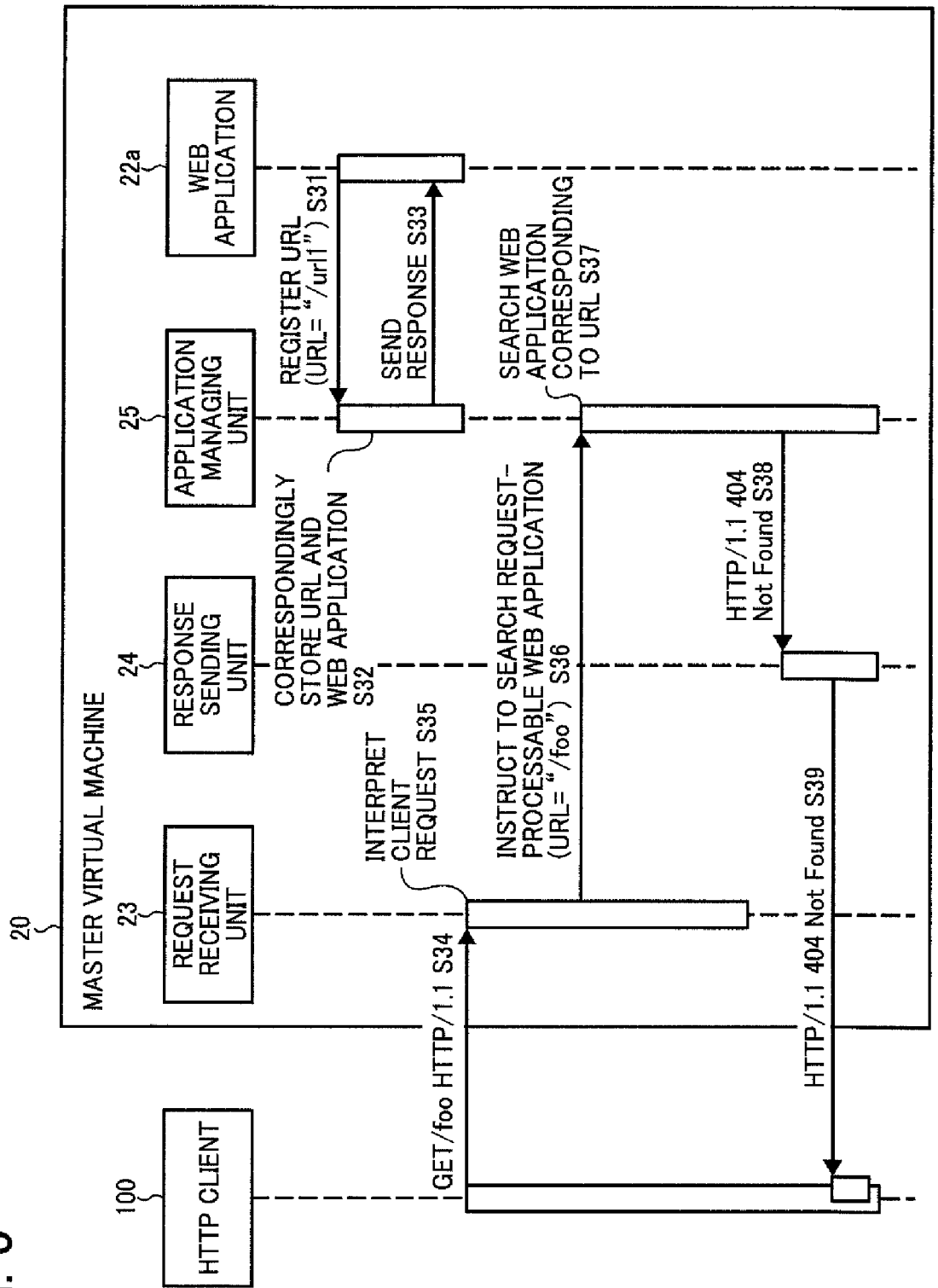
FIG. 5 is a sequence diagram for explaining a case when a web application that can process a client request is not installed in the master virtual machine.

FIG. 5 is a sequence diagram for explaining a case when a web application that can retrieve a file from the address specified in a requested URL is not installed in the master virtual machine 20. Steps S31 to S36 in FIG. 5 are identical to Steps S11 to S16 in FIG. 4. Hence, their description is not repeated.

Upon receiving a client request from the request receiving unit 23 (Step S36), the application managing unit 25 refers to the correspondence table and searches for a web application that can retrieve a file from the address specified in a client request 'GET/foo HTTP/1.1' (Step S37). It is assumed that the application managing unit 25 cannot find an intended web application in the master virtual machine 20. Thus, the application managing unit 25 creates an error message '404 Not Found' and sends the error message to the response sending unit 24 (Step S38). In turn, the response sending unit 24 sends the error message to the HTTP client 100 (Step S39). In the error message '404 Not Found', '404' is an HTTP status code indicating that the resource information corresponding to the URL 'foo' is not found. When the HTTP client 100 receives the error message, the user of the client device 11 is informed that the desired resource information is not found.

Figure 6:
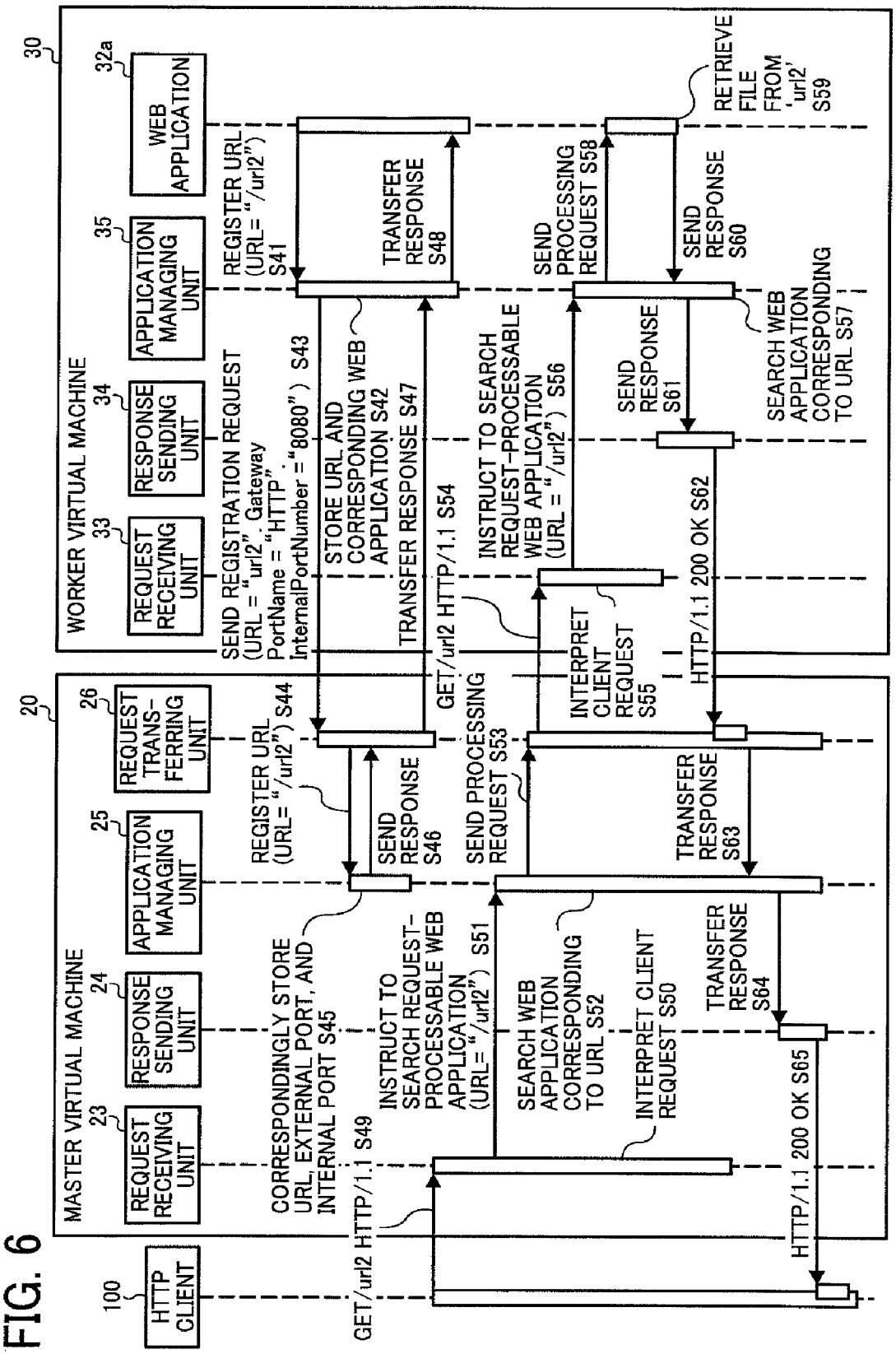
FIG. 6 is a sequence diagram for explaining a process of registering a web application in a worker HTTP server and processing a client request.

FIG. 6 is a sequence diagram for explaining a process of registering the web application 32a in the worker HTTP server 31. First, the web application 32a sends a registration request to the worker HTTP server 31 for registering a corresponding URL "/url2" (Step S41). An application managing unit 35 in the worker HTTP server 31 correspondingly stores the web application 32a and the URL "/url2" in a correspondence table (Step S42).

The worker HTTP server 31 determines whether it belongs to a master virtual machine or a worker virtual machine. When it is determined that the worker HTTP server 31 belongs to the worker virtual machine 30, the worker HTTP server 31 makes a remote procedure call (RPC) to the master HTTP server 21 as a registration request for the URL "/url2" (Step S43). A RPC is a protocol that one program can use to request a service from a program located at another address space in a network without having to understand network details. The RPC made to the master HTTP server 21 includes information about the URL "/url2", the external port used for external communication, and the internal port used for internal communication. In this way, use of a RPC allows the worker HTTP server 31 to dynamically register the URL "/url2" in the master HTTP server 21. Thus, even when a new web application is developed for the worker HTTP server 31 (or for the worker HTTP server 41), there is no need to make any modifications in the master HTTP server 21. That reduces the workload of a developer thereby enhancing the developing efficiency.

In the master HTTP server 21, the request transferring unit 26 receives the registration request and transfers it to the application managing unit 25 (Step S44). The application managing unit 25 correspondingly stores the information in the registration request in the correspondence table (Step S45) and sends a storage completion response to the request transferring unit 26 (Step S46). In turn, the request transferring unit 26 transfers the storage completion response to the application managing unit 35 (Step S47).

Subsequently, the application managing unit 35 sends the storage completion response to the web application 32a (Step S48). That marks the completion of the registration process. Meanwhile, the process of registering the web application 32b in the worker HTTP server 31 or the process of registering the web applications 42a and 42b in the worker HTTP server 41 is also performed in an identical manner.

Consider a case when the HTTP client 100 sends a client request 'GET/url2HTTP/1.1' to the master virtual machine 20 (Step S49). The request receiving unit 23 receives and interprets the client request (Step S50). Herein, the client request 'GET/url2HTTP/1.1' is interpreted as 'retrieve the file from the address specified in the URL "/url2" by using the transfer protocol HTTP/1.1'. Subsequently, the request receiving unit 23 sends the client request to the application managing unit 25 (Step S51) and instructs the application managing unit 25 to search for a web application that can retrieve the file from the address specified in the URL "/url2" (Step S52).

However, the web application corresponding to the "/url2" is the web application 32a, which is installed in the worker virtual machine 30. Thus, the application managing unit 25 cannot find the web application 32a in the master virtual machine 20. Consequently, the application managing unit 25 instructs the request transferring unit 26 to transfer the client request to the worker HTTP server 31 (Step S53). The request transferring unit 26 transfers the client request to the worker virtual machine 30 via the internal port 8080 (Step S54).

Meanwhile, because of the HTTP format of a client request transferred from the master HTTP server 21, the worker HTTP servers 31 and 41 are able to treat the client request as if it is received from a commonly used web browser program. Thus, there is no need to make any particular modifications in the worker HTTP servers 31 and 41 for processing the client request. Moreover, as described above, the worker HTTP servers 31 and 41 communicate only with the master HTTP server 21 by using a loopback address. Thus, the client device 11 is blocked from directly communicating with the worker HTTP servers 31 and 41. That limits the necessity of security measures only to the master HTTP server 21 thereby reducing the load on the overall security system of the server 10.

A request receiving unit 33 in the worker HTTP server 31 receives and interprets the client request (Step S55), and sends it to the application managing unit 35 (Step S56). The application managing unit 35 then refers to the correspondence table and searches for a web application corresponding to the URL "/url2" (Step S57). Upon finding the web application 32a as the intended web application, the application managing unit 35 sends a processing request to the web application 32a (Step S58). Subsequently, the web application 32a retrieves the file from the address specified in the URL "/url2" (Step S59) and sends a response to the application managing unit 35 (Step S60). The application managing unit 35 then transfers the response to a response sending unit 34 of the worker virtual machine 30 (Step S61). In turn, the response sending unit 34 sends the response to the request transferring unit 26 via the internal port 8080 (Step S62).

In the master HTTP server 21, the request transferring unit 26 transfers the response to the response sending unit 24 via the application managing unit 25 (Steps S63 and S64). The response sending unit 24 sends the response to the HTTP client 100 via the external port (Step S65).

In this way, the master HTTP server 21 correspondingly stores the address information of web applications in each virtual machine and port information of that virtual machine in a correspondence table. Thus, upon receiving a client request from the HTTP client 100, the master HTTP server 21 can determine the virtual machine that includes a web application corresponding to the address information in the client request and send the client request to that virtual machine for processing.

Given below is the description of a case when a plurality of web applications installed in more than one worker virtual machines correspond to a URL with an identical extension.

As described above, a web application framework is used to develop a Java based web application. There are many web application frameworks, either commercial or open-source, available for developing a web application. Some of the web application frameworks allow a web application to retrieve a file based only on its extension, regardless of the directory path of the file specified in a URL. In that case, if more than one web applications are configured to process files with a predetermined extension, a URL with that predetermined extension corresponds to each of those web applications.

FIG. 7 is a sequence diagram for explaining a process of registering the web applications 32a and 42a, when each of the web applications 32a, 32b, 42a, and 42b correspond to a URL with an extension '.cgi'. Meanwhile, the process of registering the web applications 32b and 42b is identical to the description with reference to FIG. 7.

The web application 32a sends a registration request to the worker HTTP server 31 for registering a corresponding URL "/*.cgi", where asterisk (*) represents an arbitrary character string used as a file name of a .cgi file (Step S71). The application managing unit 35 correspondingly stores the web application 32a and the URL "/*.cgi" in a correspondence table (Step S72).

The worker HTTP server 31 determines whether it belongs to a master virtual machine or a worker virtual machine. When it is determined that the worker HTTP server 31 belongs to the worker virtual machine 30, the worker HTTP server 31 sends a registration request to the master HTTP server 21 (Step S73).

Similarly, the web application 42a sends a registration request to the worker HTTP server 41 for registering a corresponding URL "/*.cgi" (Step S74). An application managing unit 45 in the worker HTTP server 41 correspondingly stores the web application 42a and the URL "/*.cgi" in a correspondence table (Step S75). Subsequently, the worker HTTP server 41 determines whether it belongs to a master virtual machine or a worker virtual machine. When it is determined that the worker HTTP server 41 belongs to the worker virtual machine 40, the worker HTTP server 41 sends a registration request to the master HTTP server 21 (Step S76).

The request transferring unit 26 receives the registration requests from the web application 32a and the web application 42a. Each registration request includes information about the corresponding URL "/*.cgi", the external port, and the corresponding internal port. The request transferring unit 26 transfers both registration requests to the application managing unit 25 (Steps S77 and S78). The application managing unit 25 correspondingly stores the information of each registration request in the correspondence table (Steps S79 and S80) and sends a storage completion response to the request transferring unit 26 (Steps S81 and S82). The request transferring unit 26 transfers the storage completion response to each of the application managing unit 35 and the application managing unit 45 (Steps S83 and S84). Subsequently, the application managing unit 35 sends the storage completion response to the web application 32a (Step S85), while the application managing unit 45 sends the storage completion response to the web application 42a (Step S86). That marks the completion of the registration process.

Although the registered URLs of the web applications 32a and 42a have an identical extension, the master HTTP server 21 is able to distinguish between the web applications 32a and 42a by the corresponding internal port numbers. That is, each web application is uniquely identifiable based on the internal port number used by the corresponding virtual machine. As a result, while developing a new web application, there is no need to worry about other web applications that correspond to a URL with an identical extension. That reduces the workload of a developer thereby enhancing the developing efficiency.

Consider a case when the HTTP client 100 sends a client request 'GET/url/app2.cgi HTTP/1.1' to the master virtual machine 20 (Step S87). The request receiving unit 23 receives and interprets the client request (Step S88). Herein, the client request 'GET/url/app2.cgi HTTP/1.1' is interpreted as 'retrieve a file 'app2.cgi' from a directory 'url' by using the transfer protocol HTTP/1.1.

Subsequently, the request receiving unit 23 sends the client request to the application managing unit 25 and instructs the application managing unit 25 to search for a web application that corresponds to the URL "/*.cgi" and can retrieve the file 'app2.cgi' (Step S89). The application managing unit 25 then refers to the correspondence table and searches for an intended web application (Step S90). However, because no web application corresponding to the URL "/*.cgi" is installed in the master virtual machine 20, the application managing unit 25 instructs the request transferring unit 26 to transfer the client request to either one of the worker HTTP servers 31 and 41 (Step S91).

Thus, the request transferring unit 26 transfers the client request to either one of the worker virtual machines 30 and 40 via the corresponding internal port (Step S92). Moreover, the request transferring unit 26 temporarily stores the client request in the request storing unit 27 for future transfers (Step S93).

While transferring the client request at Step S92, the request transferring unit 26 takes into consideration, e.g., a transfer sequence stored in advance in the application managing unit 25 or the order of priority of the worker virtual machines 30 and 40 stored in the transfer order storing unit 28. In the example shown in FIG. 7, the worker virtual machine 30 is assumed to have the highest priority. Thus, the request transferring unit 26 transfers the client request to the worker virtual machine 30 via the internal port 8080.

In the worker HTTP server 31, the request receiving unit 33 receives and interprets the client request (Step S94), and sends it to the application managing unit 35 (Step S95).

The application managing unit 35 then refers to the correspondence table and searches for an intended web application 32a (Step S96). Herein, it is assumed that the web application 32a corresponds to the URL "/*.cgi" and can retrieve the file 'app2.cgi'. Thus, upon finding the web application 32a, the application managing unit 35 sends a processing request to the web application 32a (Step S97). Subsequently, the web application 32a retrieves the file 'app2.cgi' from the directory path 'url' (Step S98) and sends a response to the application managing unit 35 (Step S99). The application managing unit 35 then transfers the response to the response sending unit 34 (Step S100). In turn, the response sending unit 34 sends the response to the request transferring unit 26 via the internal port 8080 (Step S101).

In the master HTTP server 21, the request transferring unit 26 determines whether the response includes a predetermined status code '900' (Step S102). The predetermined status code '900' indicates that the web application corresponding to the registered URL is not installed in the worker virtual machine to which the client request is transferred. If the response does not include the predetermined status code '900' (No at Step S102), then the request transferring unit 26 transfers the response to the response sending unit 24 via the application managing unit 25 (Steps S103 and S104). The response sending unit 24 then sends the response to the HTTP client 100 via the external port (Step S105).

Meanwhile, the predetermined status code is not limited to '900' and can be set to any value except for HTTP status code values.

The order of priority of the worker virtual machines 30 and 40, which is stored in the transfer order storing unit 28, is a user-specified order. The order of priority comes to effect when the server 10 boots and can be dynamically modified while the server 10 is running.

Thus, while transferring a client request, the request transferring unit 26 obtains the order of priority from the transfer order storing unit 28 and transfers the request to a worker virtual machine of the highest priority from among worker virtual machines to which a client request is not yet transferred. If the response from that worker virtual machine includes the predetermined status code '900', i.e., if that worker virtual machine does not include a web application corresponding to the client request, then the request transferring unit 26 transfers the client request to a worker virtual machine with the second highest priority. If that worker virtual machine includes a web application corresponding to the client request, then that web application is instructed to process the client request and send a response to the request transferring unit 26.

As described above, the client requests are temporarily stored in the request storing unit 27 for future transfers. However, a usable high-speed memory such as a random access memory (RAM) in the server 10 has an upper limit for storing capacity. If the size of client requests exceeds the upper limit of the high-speed memory, then the request storing unit 27 can be temporarily stored in another storage medium such as a hard disk drive (HDD). That helps in retrieving the client requests from the request storing unit 27 for transfer when necessary.

FIG. 8 is a sequence diagram for explaining a case when the worker virtual machine of the highest priority does not include a web application that can process a client request.

Consider a case when the HTTP client 100 sends a client request 'GET/url/app3.cgi HTTP/1.1' to the master virtual machine 20 (Step S111). The request receiving unit 23 receives and interprets the client request (Step S112). Herein, the client request 'GET/url/app3.cgi HTTP/1.1' is interpreted as 'retrieve a file 'app3.cgi' from the directory 'url' by using the transfer protocol HTTP/1.1.

Subsequently, the request receiving unit 23 sends the client request to the application managing unit 25 and instructs the application managing unit 25 to search for a web application that corresponds to the URL "/*.cgi" and can retrieve the file 'app3.cgi' (Step S113). The application managing unit 25 then refers to the correspondence table and searches for an intended web application (Step S114). However, because no web application corresponding to the URL "/*.cgi" is installed in the master virtual machine 20, the application managing unit 25 instructs the request transferring unit 26 to transfer the client request to either one of the worker HTTP servers 31 and 41 (Step S115).

Subsequently, the request transferring unit 26 transfers the client request to either one of the worker virtual machines 30 and 40 via the corresponding internal port (Step S116). Moreover, the request transferring unit 26 temporarily stores the client request in the request storing unit 27 (Step S117) for future transfers.

While transferring the client request at Step S116, the request transferring unit 26 takes into consideration the order of priority of the worker virtual machines 30 and 40. In the example shown in FIG. 8, the worker virtual machine 30 is assumed to have the highest priority. Thus, the request transferring unit 26 transfers the client request to the worker virtual machine 30 via the internal port 8080. In the worker HTTP server 31, the request receiving unit 33 receives and interprets the client request (Step S118), and sends it to the application managing unit 35 (Step S119).

The application managing unit 35 then refers to the correspondence table and searches for an intended web application (Step S120). assumed to have the highest priority. Herein, it is assumed that the web application 42a corresponds to the URL "/*.cgi" and can retrieve the file 'app3.cgi'. That is, the web applications 32a and 32b are not configured to retrieve the file 'app3.cgi'. Thus, the application managing unit 35 makes a RPC via the web application 32a to check whether a web application that can retrieve the file 'app3.cgi' is installed in the worker virtual machine 40 (Steps S121 and S122). Meanwhile, the web application 32b can also be used to make a RPC.

In the worker virtual machine 40, each of the web applications 42a and 42b determines whether it corresponds to the URL "/*.cgi" and can retrieve the file 'app3.cgi' (Step S123). When the web application 42a determines that it can retrieve the file 'app3.cgi' (Yes at Step S123), it sends a true flag to the web application 32a (Step S124). On the other hand, because it is assumed that the web application 42b cannot retrieve the file 'app3.cgi', it sends a false flag to the web application 32a. In this way, the application managing unit 35 functions as an application searching unit to search for a web application, which can retrieve the file 'app3.cgi', in the worker virtual machine 40.

Upon receiving a true flag from the web application 42a, the web application 32a sends a success response to the application managing unit indicating that a web application is found that can retrieve the file 'app3.cgi' (Step S125). The application managing unit 35 then transfers the success response to the response sending unit 34 (Step S126). The response sending unit 34 sends a status code '900 Forward Other' to the request transferring unit 26 as a predetermined status code for a success response (Step S127).

In the master virtual machine 20, the request transferring unit 26 determines whether the predetermined status code to the success response includes '900', which indicates that the web application that can retrieve the file 'app3.cgi' is not installed in the worker virtual machine 30 (Step S128). When the predetermined status code to the success response includes '900' (Yes at Step S128), the request transferring unit 26 reads the client request 'GET/url/app3.cgi HTTP/1.1' from the request storing unit 27 (Step S129) and transfers it to the worker virtual machine 40, which has the second highest priority (Step S130). In this way, the request transferring unit 26 transfers a client request to the worker HTTP server 41 only after receiving a success response from the worker HTTP server 31 regarding a web application in the worker virtual machine 40.

In the worker HTTP server 41, a request receiving unit 43 receives and interprets the client request 'GET/url/app3.cgi HTTP/1.1' (Step S131). Subsequently, the request receiving unit 43 sends the client request to the application managing unit 45 and instructs the application managing unit 25 to search for a web application that corresponds to the URL "/*.cgi" and can retrieve the file 'app3.cgi' (Step S132). The application managing unit 45 then refers to the correspondence table and searches for an intended web application (Step S133). Upon finding the web application 42a, the application managing unit 45 sends a processing request to the web application 42a (Step S134).

Subsequently, the web application 42a retrieves the file 'app3.cgi' from the directory path 'url' (Step S135) and sends a response to the application managing unit 45 (Step S136). The response includes the file 'app3.cgi' as well as a predetermined status code '200', which indicates successful completion of processing of the client request. The application managing unit 45 then transfers the response to a response sending unit 44 in the worker HTTP server 41 (Step S137). In turn, the response sending unit 44 sends the response to the request transferring unit 26 via the internal port 8081 (Step S138).

In the master HTTP server 21, the request transferring unit 26 determines whether the response includes the predetermined status code '900' (Step S139). If the response does not include the predetermined status code '900' (No at Step S139), i.e., if the response includes the predetermined status code '200', then the request transferring unit 26 transfers the response to the response sending unit 24 via the application managing unit 25 (Steps S140 and S141). The response sending unit 24 then sends the response to the HTTP client 100 via the external port (Step S142).

FIG. 9 is a sequence diagram for explaining a case when none of the web applications 22a, 22b, 22c, 32a, 32b, 42a, and 42b correspond to a client request.

Consider a case when the HTTP client 100 sends a client request 'GET/url/app4.cgi HTTP/1.1' to the master virtual machine 20 (Step S151). The request receiving unit 23 receives and interprets the client request (Step S152). Subsequently, the request receiving unit 23 sends the client request to the application managing unit 25 and instructs the application managing unit 25 to search for a web application that corresponds to the URL "/*.cgi" and can retrieve the file 'app4.cgi' (Step S153).

The application managing unit 25 then refers to the correspondence table and searches for an intended web application (Step S154). However, because no such web application is found in the master virtual machine 20, the application managing unit 25 instructs the request transferring unit 26 to transfer the client request to either one of the worker HTTP servers 31 and 41 (Step S155).

Thus, the request transferring unit 26 transfers the client request to either one of the worker virtual machines 30 and 40 via the corresponding internal port (Step S156). Moreover, the request transferring unit 26 temporarily stores the client request in the request storing unit 27 (Step S157) for future transfers.

While transferring the client request at Step S116, the request transferring unit 26 takes into consideration the order of priority of the worker virtual machines 30 and 40. In the example shown in FIG. 9, the worker virtual machine 30 is assumed to have the highest priority. Thus, the request transferring unit 26 transfers the client request to the worker virtual machine 30 via the internal port 8080. In the worker HTTP server 31, the request receiving unit 33 receives and interprets the client request (Step S158), and sends it to the application managing unit 35 (Step S159).

The application managing unit 35 then refers to the correspondence table and searches for an intended web application (Step S160). However, because no web application that can retrieve the file 'app4.cgi' is found in the worker virtual machine 30, the application managing unit 35 makes a RPC via the web application 32a to check whether an intended web application is installed in the worker virtual machine 40 (Steps S161 and S162). Meanwhile, the web application 32b can also be used to make a RPC.

In the worker virtual machine 40, each of the web applications 42a and 42b determines whether it corresponds to the URL "/*.cgi" and can retrieve the file 'app4.cgi' (Step S163). Because it is assumed that the web applications 42a and 42b are not the intended web applications, they send false flags to the web application 32a (Step S164).

Upon receiving a false flag from each of the web applications 42a and 42b, the web application 32a sends a failure response to the application managing unit indicating that no web application is found that can retrieve the file 'app4.cgi' (Step S165). The application managing unit 35 then transfers the failure response to the response sending unit 34 (Step S166). The response sending unit 34 sends the error message '404 Not Found' to the request transferring unit 26 (Step S167).

In the master HTTP server 21, the request transferring unit 26 determines whether the error message includes the predetermined status code '900' (Step S168). When the error message does not include the predetermined status code '900' (No at Step S128), then the request transferring unit 26 transfers the error message to the response sending unit 24 via the application managing unit 25 (Steps S169 and S170). The response sending unit 24 then sends the error message to the HTTP client 100 via the external port (Step S171).

Thus, upon receiving the error message from the web application 32*a*, the request transferring unit 26 withholds from transferring the client request to the worker virtual machine 40 and immediately informs the client device 11 that the web application corresponding to client request is not found. That saves unnecessary transfer of the client request and improves the response time to the client device 11.

In this way, the master HTTP server 21 refers to the correspondence table and the address information in a client request to identify a virtual machine that includes a web application corresponding to the address information, and transfers the client request to that virtual machine. That is, irrespective of addition or deletion of web applications in a plurality of virtual machines, the master HTTP server is able to identify an intended virtual machine to process the client request.

That allows the client device 11 to utilize the web applications only by accessing the master HTTP server 21 without having to understand the configuration of the server 10.

Meanwhile, although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

Thus, virtual machines can also be configured as modules of a single computer-readable program and the program can be executed in a server. Such a computer-readable program can be provided in a recording medium such as a compact disk read only memory (CD-ROM) or a memory card.

According to one aspect of the present invention, upon receiving a client request from a client device, a virtual machine is identified for processing the client request by referring to address information specified in the client request, application information of web applications in each virtual machine, and identification information of each virtual machine. The client request is then transferred to the identified virtual machine. Thus, irrespective of addition or deletion of web applications in a plurality of virtual machines, it is possible to identify an intended virtual machine to process the client request.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that receives information from a client device, processes the information, and sends a processing result to the client device, the information processing apparatus comprising a plurality of virtual machines, each of the virtual machines including
an application;
a request receiving unit that receives a request issued by the client device and extracts from the request address information of an application that can process the request; and
an application managing unit that correspondingly stores the application and an address thereof as application information, and that, when the request receiving unit receives a request, determines whether the application can process the request by referring to the application information and the address information, wherein
one of the virtual machines includes a request transferring unit that correspondingly stores application information and identification information of each of remaining virtual machines as overall application information, and that, when the request receiving unit receives from the client device a request having address information of an application in one of the remaining virtual machines, identifies a virtual machine from among the remaining virtual machines to which the request is to be transferred by referring to the overall application information and the address information, and transfers the request to identified virtual machine.

2. The information processing apparatus according to claim 1, wherein
each of the virtual machines includes an HTTP server, the HTTP server including the request receiving unit, the application managing unit, and a response sending unit that, after a request is processed by corresponding application, sends processing result either one of directly to the client device if corresponding HTTP server includes the request transferring unit and to the client device via the virtual machine including the request transferring unit if corresponding HTTP server does not include the request transferring unit, and
one of the HTTP servers includes the request transferring unit and functions as a master HTTP server, and each of remaining HTTP servers functions as a worker HTTP server that, upon receiving a request from the master HTTP server, processes the request and sends processing result to the master HTTP server.

3. The information processing apparatus according to claim 2, wherein the master HTTP server transfers a request to a worker HTTP server by using HTTP.

4. The information processing apparatus according to claim 3, wherein
the master HTTP server communicates with the client device via an external port,
each of the worker HTTP servers communicates with the master HTTP server via an internal port, and
each of the worker HTTP servers uses a loopback address to receive a request from the master HTTP server and send processing result to the master HTTP server.

5. The information processing apparatus according to claim 2, wherein
each of the worker HTTP servers makes a remote procedure call to send a URL as an address of corresponding application to the master HTTP server, and
the master HTTP server correspondingly stores the application and the URL as application information.

6. The information processing apparatus according to claim 5, wherein the request transferring unit receives a plurality of applications corresponding to an identical URL from more than one of the worker HTTP servers and correspondingly stores the applications and the URL as application information.

7. The information processing apparatus according to claim 6, wherein the master HTTP server further includes a request storing unit for storing a request from the client device and a transfer order storing unit for storing information regarding an order of priority in which a request is to be transferred to the worker HTTP servers.

8. The information processing apparatus according to claim 7, wherein
when a response from a worker HTTP server, to which a request is currently transferred, indicates that another virtual machine includes an application for processing the request, the request transferring unit transfers the request to a worker HTTP server of a virtual machine of second highest priority subsequent to a priority of a virtual machine that includes the worker HTTP server to which the request was previously transferred, when a response from the worker HTTP server, to which a request is currently transferred, indicates that no other virtual machine includes an application for processing the request, the request transferring unit does not transfer the request to the virtual machine of the second highest priority and informs the client device that an application for processing the request is not found, and each worker HTTP server includes an application searching unit that, when a request transferred thereto is not processable by an application in corresponding virtual machine, searches for an application in another virtual machine for processing the request and, based on search result, informs the request transferring unit whether an application for processing the request is found in another virtual machine.

9. A method of information processing in an information processing apparatus that includes a plurality of virtual machines, one of the virtual machines functioning as a master virtual machine and remaining virtual machines functioning as worker virtual machines, each of the virtual machines correspondingly storing an application and an address thereof as application information, the master virtual machine correspondingly storing the application information and identification information of each of the worker virtual machines as overall application information, the method comprising:

identifying, when the master virtual machine receives from a client device a request that has address information of an application in one of the worker virtual machines, a worker virtual machine to which the request is to be transferred by referring to the overall application information and the address information;

transferring the request from the master virtual machine to identified worker virtual machine;

determining an application in the identified worker virtual machine that can process the request by referring to corresponding application information and the address information;

processing the request with determined application; and sending a processing result from the identified worker virtual machine to the master virtual machine.

10. The method according to claim 9, wherein HTTP is used to transfer the request at the transferring.

11. The method according to claim 9, further comprising:

making a remote procedure call from each of the worker virtual machines to the master virtual machine to send a URL corresponding to an application to be registered in the master virtual machine; and registering that includes correspondingly storing the application and the URL as application information in the master virtual machine.

12. The method according to claim 11, wherein the making includes making a remote procedure call from more than one of the worker HTTP servers to the master virtual machine to send an identical URL corresponding to a plurality of applications to be registered in the master virtual machine, and the registering includes correspondingly storing the applications and the URL as application information in the master virtual machine.

13. The method according to claim 12, wherein, the request at the transferring is transferred to a worker virtual machine of highest priority from among the worker virtual machines.

14. The method according to claim 13, wherein, when a response from a worker virtual machine to which a request is currently transferred indicates that another worker virtual machine includes an application for processing the request, the request at the transferring is transferred to a worker virtual machine of second highest priority subsequent to a priority of the worker virtual machine to which the request was previously transferred.

15. The method according to claim 14, further comprising responding that, when a response from the worker virtual machine to which a request is currently transferred indicates that no other virtual machine includes an application for processing the request, includes withholding from transferring the request to the worker virtual machine of second highest priority and sending a response to the client device indicating that an application for processing the request is not found.

16. The method according to claim 9, further comprising:

searching, if a request is not processable by an application in the worker virtual server to which a request is currently transferred, an application in another worker virtual machine; and informing the master virtual machine whether an application for processing the request is found in another virtual machine based on search result.

17. A computer program product comprising a computer-usable medium having computer-readable program codes embodied in the medium for processing information in an information processing apparatus that includes a plurality of virtual machines, wherein one of the virtual machines functioning as a master virtual machine and remaining virtual machines functioning as worker virtual machines, each of the virtual machines correspondingly storing an application and an address thereof as application information, the master virtual machine correspondingly storing the application information and identification information of each of the worker virtual machines as overall application information, and the program codes when executed causing a computer to execute:

identifying, when the master virtual machine receives from a client device a request that has address information of an application in one of the worker virtual machines, a worker virtual machine to which the request is to be transferred by referring to the overall application information and the address information;

transferring the request from the master virtual machine to identified worker virtual machine;

determining an application in the identified worker virtual machine that can process the request by referring to corresponding application information and the address information;

processing the request with determined application; and sending a processing result from the identified worker virtual machine to the master virtual machine.

* * * * *